(12) United States Patent
Alavi

(10) Patent No.: US 8,267,348 B2
(45) Date of Patent: Sep. 18, 2012

(54) UNMANNED AIRCRAFT AS A PLATFORM FOR TELECOMMUNICATION OR OTHER SCIENTIFIC PURPOSES

(76) Inventor: Kamal Alavi, Walchwil (CH)

( * ) Notice: Subject to any disclaimer, the term of this patent is extended or adjusted under 35 U.S.C. 154(b) by 1025 days.

(21) Appl. No.: 11/994,014

(22) PCT Filed: Jun. 30, 2005

(86) PCT No.: PCT/EP2005/007074

§ 371 (c)(1),
(2), (4) Date: Jul. 3, 2008

(87) PCT Pub. No.: WO2007/003206

PCT Pub. Date: Jan. 11, 2007

(65) Prior Publication Data

US 2009/0114767 A1 May 7, 2009

(51) Int. Cl.
*B64B 1/02* (2006.01)
(52) U.S. Cl. ........................................................ 244/30
(58) Field of Classification Search .................. 244/30, 244/31, 24, 36, 96–99, 128, 94, 126
See application file for complete search history.

(56) References Cited

U.S. PATENT DOCUMENTS

| | | | | |
|---|---|---|---|---|
| 1,834,614 A * | 12/1931 | Hall | ................................ | 244/97 |
| 2,451,815 A * | 10/1948 | Donnell et al. | ................. | 244/96 |
| 3,432,122 A * | 3/1969 | Ross et al. | ....................... | 244/31 |
| 4,773,617 A * | 9/1988 | McCampbell | ................... | 244/24 |
| 5,104,060 A * | 4/1992 | Brotz | ............................... | 244/31 |
| 5,348,254 A * | 9/1994 | Nakada | ........................... | 244/97 |
| 5,890,676 A * | 4/1999 | Coleman et al. | .............. | 244/128 |
| 6,386,480 B1 * | 5/2002 | Perry et al. | ...................... | 244/24 |
| 6,425,552 B1 * | 7/2002 | Lee et al. | ........................ | 244/97 |
| 6,739,549 B2 * | 5/2004 | Senepart | .......................... | 244/24 |
| 7,568,656 B2 * | 8/2009 | Handley | ........................... | 244/24 |

* cited by examiner

*Primary Examiner* — Tien Dinh
(74) *Attorney, Agent, or Firm* — Brian Roffe

(57) ABSTRACT

Unmanned aircraft used as a platform for telecommunication or other scientific purposes at a predetermined altitude in the stratosphere. The unmanned aircraft includes a pressurized balloon filled with gas and that supports the platform. The pressurized balloon is arranged within an outer balloon provided with an aerodynamic external shape in the stratosphere and forms a low-pressure or high-pressure insulating chamber around the pressurized balloon. A heating and cooling system circulates medium in the insulating chamber and electrically driven propellers are located outside the outer balloon to maintain the position of the platform relative to the Earth. The negative effects that extreme differences in temperature have on the gas pressure in the pressurized balloon are thus largely cancelled such that the pressurized balloon can be made of a lighter and cheaper material and the service life thereof is effectively extended.

20 Claims, 5 Drawing Sheets

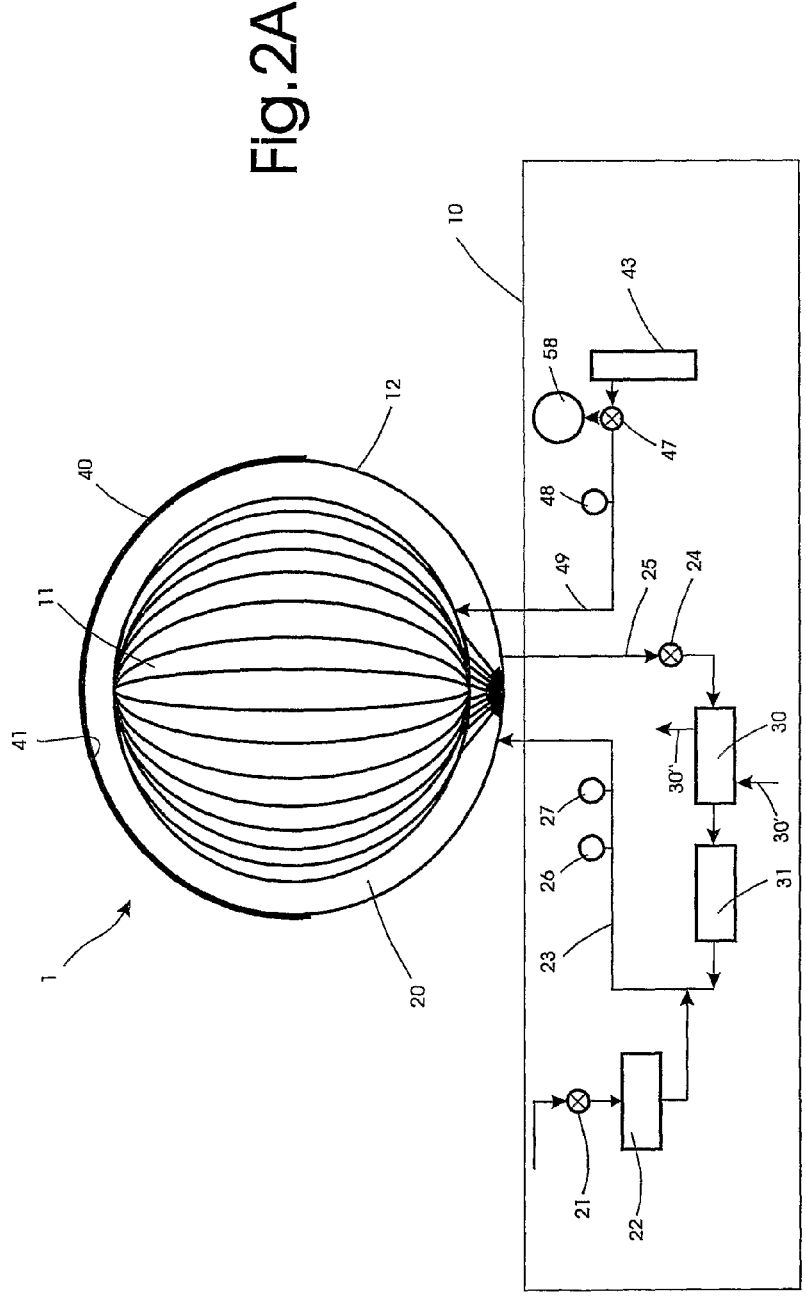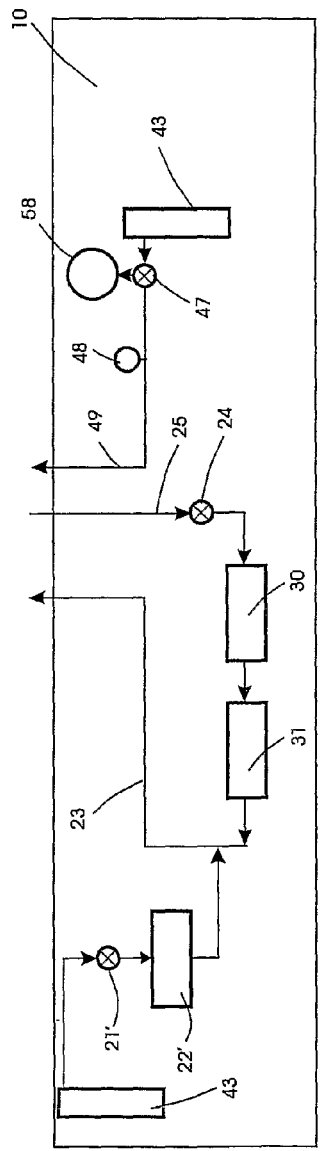

Figure 1:
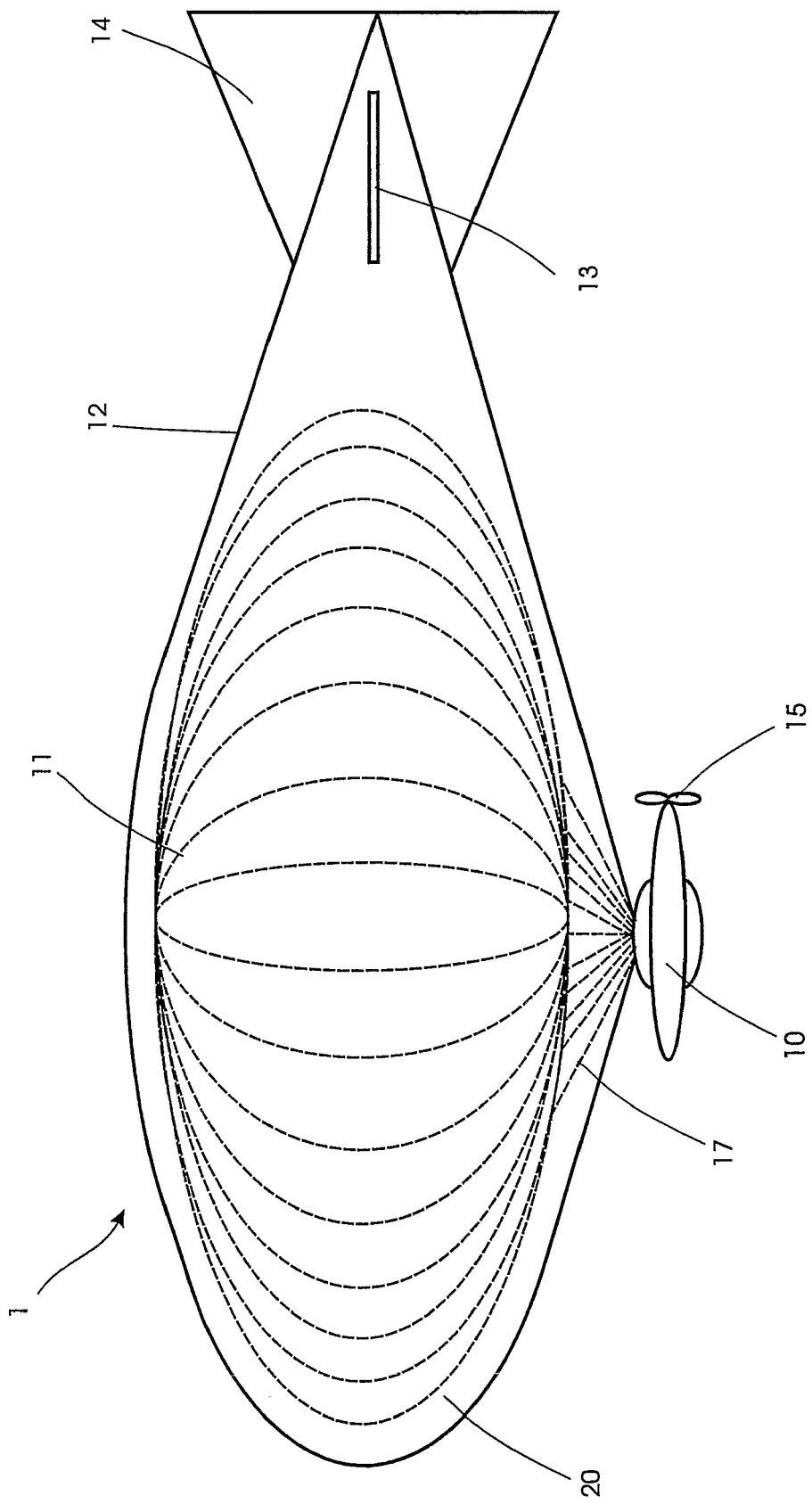

UNMANNED AIRCRAFT AS A PLATFORM FOR TELECOMMUNICATION OR OTHER SCIENTIFIC PURPOSES

The invention relates to an unmanned aircraft as a platform for telecommunications or other scientific purposes, at a predetermined height in the stratosphere according to the preamble of claim 1.

The use of gas-filled pressurised balloons to station diverse telecommunications and/or monitoring platforms in the stratosphere is known, for example, from U.S. Pat. No. 5,104,059.

Unlike so-called low-pressure balloons, these can remain in the stratosphere over long periods. One particular problem of such pressurised balloons arises from the extreme variations in temperature to which they are exposed, firstly throughout the day and secondly during the night. In the daytime, the balloon's surface is exposed to direct solar radiation, and the gas in the balloon's interior is heated by the solar radiation, causing the gas pressure to rise. In the night, on the other hand, the ambient and the gas temperature falls and therefore also the gas pressure in the pressurised balloon. This imposes even more demands on the material and the construction of the pressurised balloon, which is subjected to high pressure. It also makes it more difficult to maintain the platform's altitude and position with respect to the earth.

The present invention is based on the problem of creating an unmanned aircraft of the aforementioned type in which the gas-filled pressurised balloon supporting the platform can be kept at the desired altitude and position in optimal fashion, and additionally has a long lifetime.

This problem is solved according to the invention by an aircraft with the features of claim 1.

Further preferred embodiments of the aircraft according to the invention form the subject matter of the dependent claims.

In the aircraft according to the invention, in which the pressurised balloon is arranged inside an outer balloon inflatable in the stratosphere into an aerodynamic external shape, which forms at least one low or high pressure insulation chamber filled with a medium encircling the pressurised balloon, with heating and cooling means being provided for the medium circulating in the insulation chamber, the negative effects of the extreme temperature variations on the gas pressure in the pressurised balloon are largely avoided, so that it can be produced from a lighter and cheaper material, and its lifetime is durably increased, which is also due to the fitting of the propeller to the platform and not to the balloon.

The platform's position with respect to the earth can be kept as stable as possible over long periods due to the largely constant gas pressure in the pressurised balloon and the electrically-driven propeller outside the outer balloon.

The aircraft according to the invention, because the outer balloon is only inflated in the stratosphere or on the ground and given its aerodynamic form, can easily rise through the troposphere to the desired altitude of 20 to 30 km, if air is used—contrary to the known, Zeppelin-type aircraft with metal frames, in which, especially in this ascending phase, some difficulties have to be overcome, which is explained below in more detail.

Figure 3:
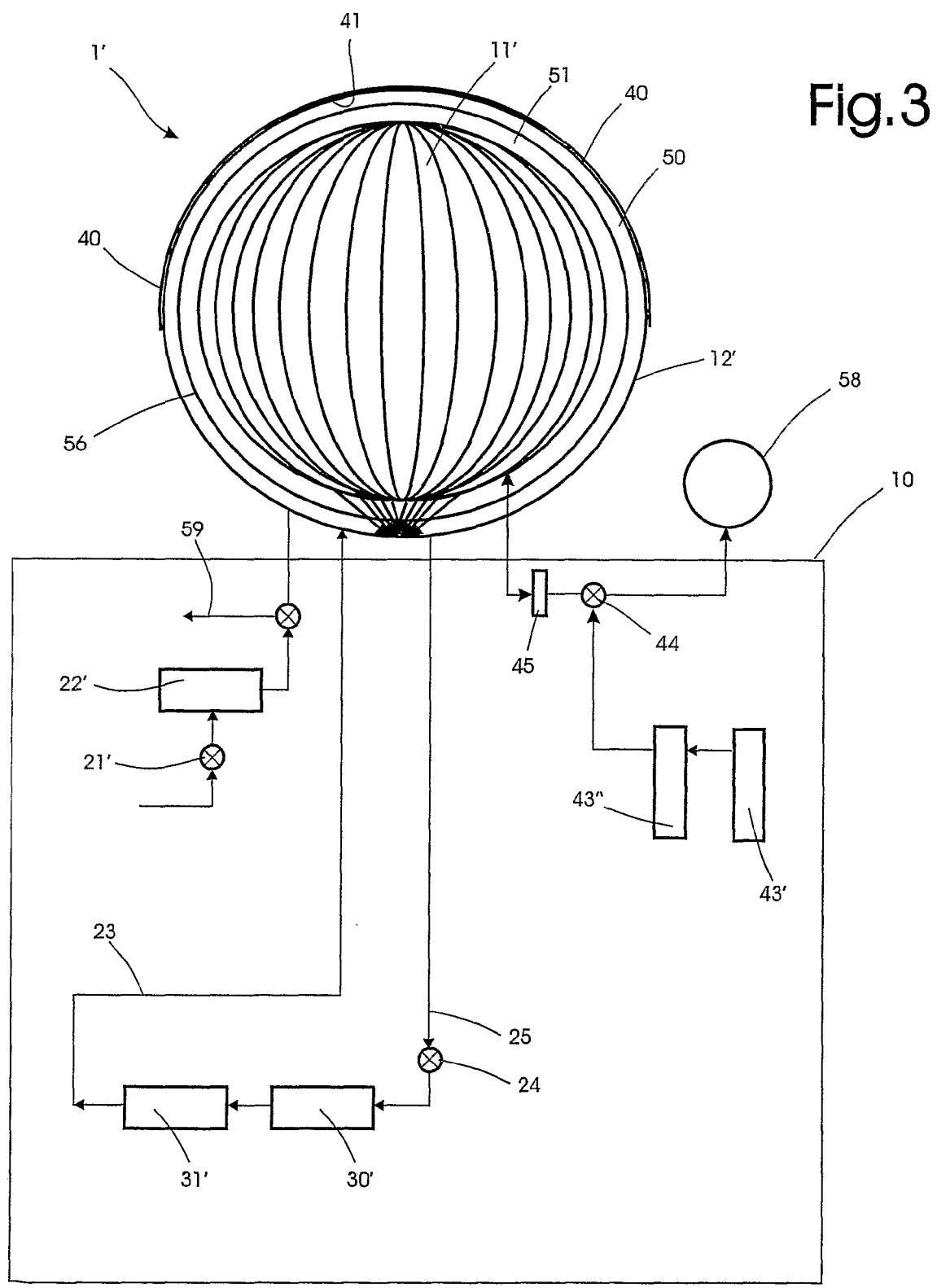
Figure 4:
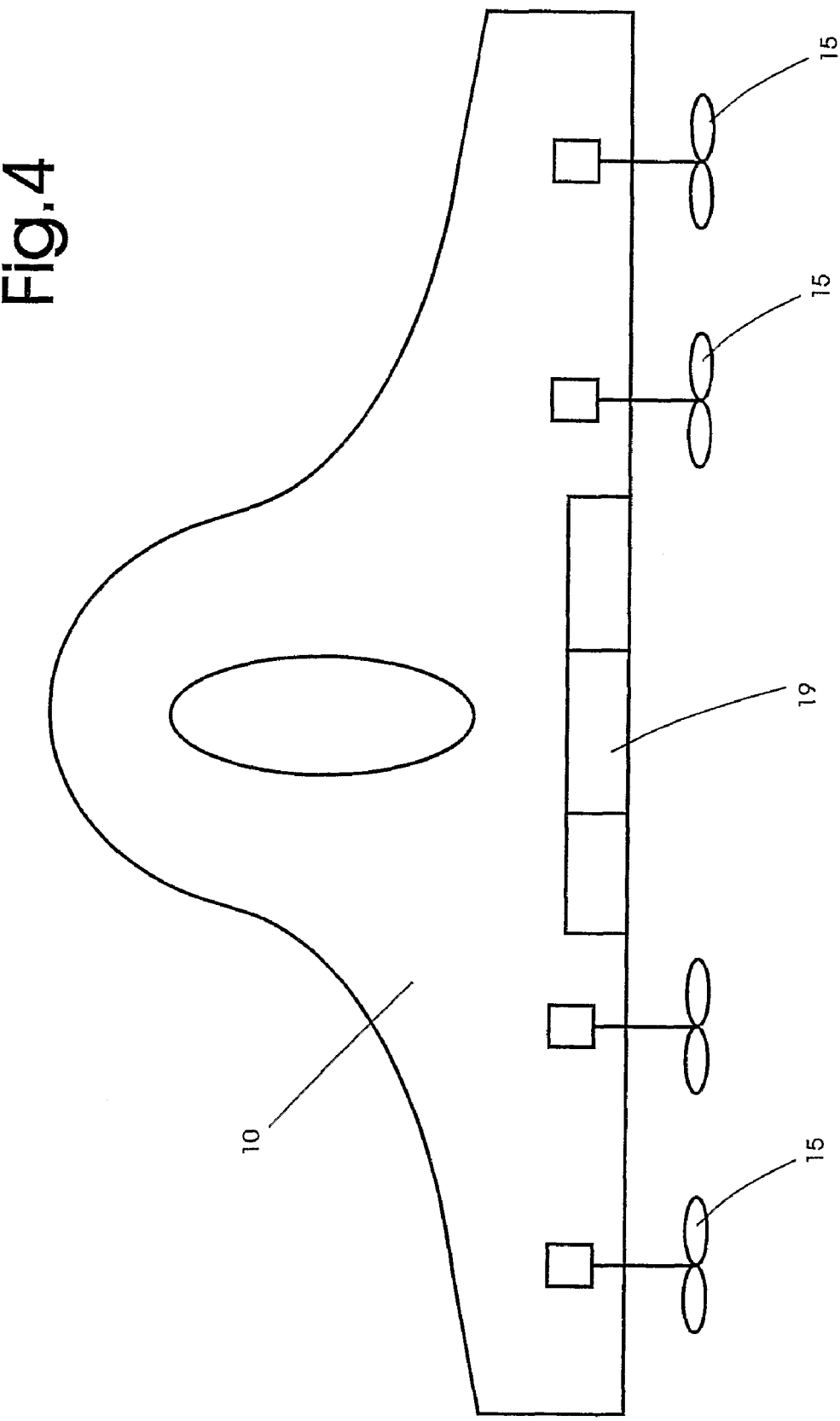
Figure 5:
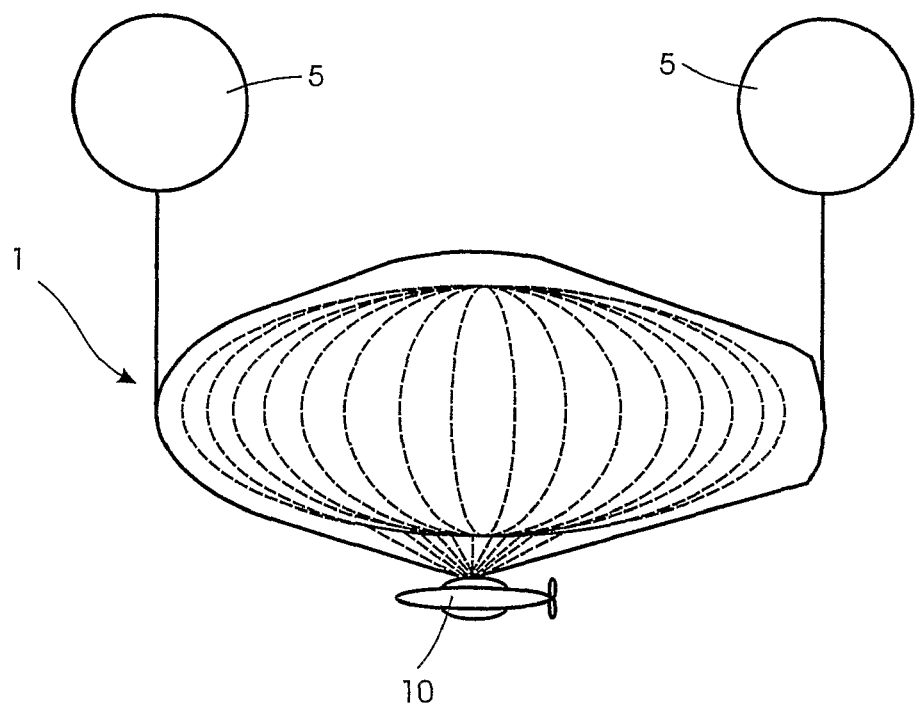
Figure 6:
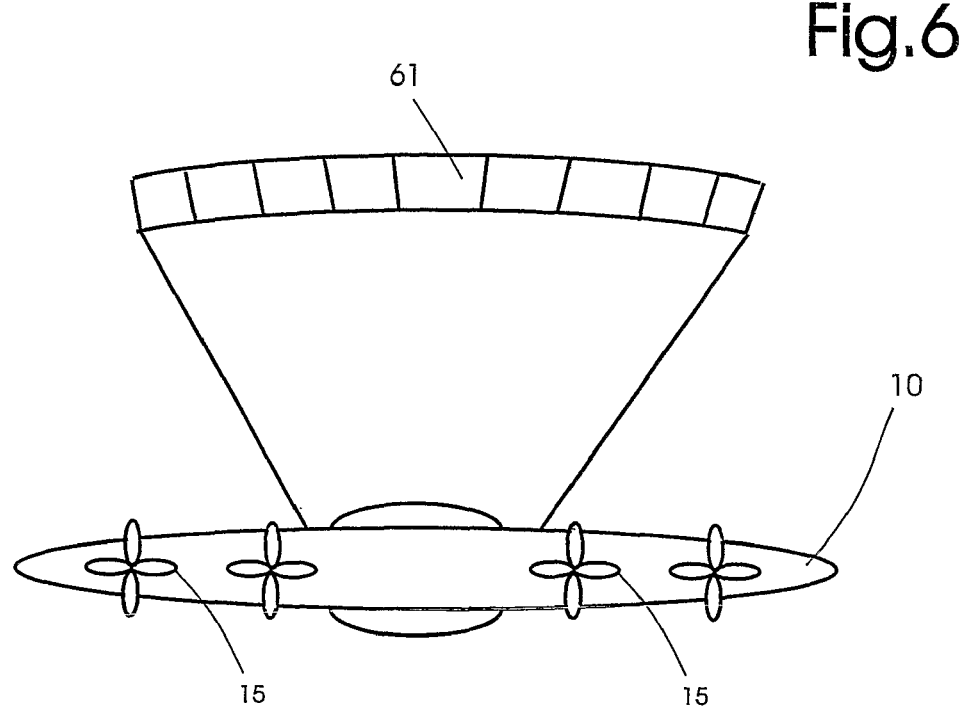

The invention will next be explained in more detail with the aid of the drawings, which show in purely diagrammatic form:

FIG. 1 an embodiment of an aircraft according to the invention in schematic lateral view;

FIG. 2A a part of the aircraft according to FIG. 1 in cross-section, with a circuit diagram for a heating and a cooling unit; where air is used in the outer insulation chamber;

FIG. 2B a part of the aircraft according to FIG. 1 in cross-section, with a circuit diagram for a heating and a cooling unit, where helium is used in the outer insulation chamber;

FIG. 3 a view corresponding to FIG. 2 of a further embodiment of the aircraft according to the invention;

FIG. 4 a schematic view from above onto the platform of the aircraft;

FIG. 5 a schematic view of the aircraft according to the invention while ascending into the stratosphere; and FIG. 6 the platform seen from the rear while returning to earth.

FIG. 1 is a schematic view of an unmanned aircraft 1, in particular a platform 10 for wireless communication and/or for other scientific purposes, a so-called "high altitude platform", in the stratosphere. This aircraft 1 can hereby be controlled in such a way that it adopts a stationary position with respect to the earth or it can also be arranged to be movable with respect to the earth, if for example it is to be positioned flying stationary with respect to a satellite in space. This aircraft is suitable, not only as a transmission station for telecommunications, but also for scientific measurement purposes, as a transmission station for TV or radio stations, for photographic purposes, as a weather station and much more. It is equipped with a GPS and other control devices, so that automatic on-board guidance of the aircraft is enabled, with the aircraft being more or less remotely controlled by a control centre on earth; there is an electronic connection.

According to FIG. 1, the aircraft 1 is already at the desired altitude of 20 to 30 km, which is advantageous in terms of wind conditions. The platform 10, equipped with corresponding devices ("payload plane") is supported by a pressurised balloon 11 filled with gas, preferably helium. As a variant, it is possible for this platform 10 to be supported by support elements 17 extending around the balloon 11, for example belts or suchlike.

The pressurised balloon 11, which usefully takes the form of a pumpkin or other shape ("pumpkin balloon") sits within an outer balloon 12 which has an aerodynamic outer form, which is filled with a medium and inflated into the aerodynamic outer form only once the platform 10 has been brought by means of the pressurised balloon 11 to the desired altitude, in particular of 20.7 km, without any problem through the troposphere.

The outer balloon 12 is equipped at its rear end with an elevator and rudder unit 13, 14. There are also means to maintain the position of the aircraft and the platform with respect to the rotating earth. These include electrically-drivable propellers 15 for the forward propulsion of the aircraft or also for aircraft stabilisation, located outside the platform 10. Here the propellers 15 can be driven at individual speeds, in order always to keep the aircraft in the same axis with respect to the surface of the earth. The propellers 15 can also be disposed pivotably on the platform 10 and thus serve both the aforementioned purposes. The aircraft 1 according to the invention is also equipped with a controller and with an electronic autopilot system.

In the aircraft variant shown schematically in FIGS. 1 and 2 A, the outside air is used as medium to fill and inflate the outer balloon. A low or high pressure insulation chamber 20 filled with outside air is formed about the pressurised balloon 11, into which insulation chamber the outside air is pumped and brought into circulation, while means according to the invention are provided with which the air circulating in the insulation chamber 20 can be heated up or cooled down by thermal exchange, so that the pressurised balloon 11 is, so to speak, protected from the temperature differentials which arise for example during the night and in the daytime and its gas pressure alters as little as possible. Instead of air, a medium such as helium or another gas or even a foam-type mass with a high insulation value, for example Styropor®, could also be used.

The outside air is pumped, according to FIG. 2A, by means of a pump 21 into a compensation tank 22 and from there fed via a supply line 23 into the insulation chamber 20, with a further pump 24 providing for the air circulation. The air drawn out of the insulation chamber 20 by the pump 24 via a drainage line 25 goes via a cooling unit 30 arranged outside the outer balloon 12 and a heating unit 31, also arranged outside the outer balloon 12, back into the supply line 23 and via this back into the insulation chamber 20. The cooling unit 30 and the heating unit 31 are thereby used alternately.

The air which heats up by day in the insulation chamber 20 due to the solar radiation acting upon the outer balloon 12 is cooled down in the cooling unit 30, while the air which cools down during the night in the insulation chamber 20 is heated up in the heating unit 31. This process is controlled such that the temperature fluctuations of the air circulating in the insulation chamber 20 are kept as small as possible. A pressure 26 and a temperature 27 measurement device are provided for this purpose, which are connected with a control unit, not shown in more detail, for the purpose of automatic regulation.

The cooling unit 22 is a heat exchanger, in which the low temperature (−40° C. or lower) of the outside air is exploited as cooling medium. Accordingly, cold air is drawn in through an intake pipe 30' for use as cooling medium, and exhausted again as appropriate via a pipe 30".

The heating unit 31 is electrically powered. Solar energy is used to generate the electricity, to which end the outer balloon 12, the base material of which is polyethylene, is provided on its surface with a solar collector film 40. The electrical energy produced during the day by solar radiation is stored in batteries.

The outer balloon 12 is also provided according to the invention with an infrared collector film 41, with which the infrared re-radiation from the earth during the night is exploited. The infrared collector film 41 on the inner side of the solar collector film 40 is preferably made of a dark, approximately 12 µm thick aluminium film, a colour coat or similar. Both the outer balloon 12 and the pressurised balloon 11 connected to a helium reservoir 43 are advantageously made from a transparent plastic material, with the infrared collector film 41 being attached on the inner side of the outer balloon 12 facing towards the earth. The infrared radiation can then penetrate through both balloons from below and so helps to compensate, in temperature terms, for the cooling which otherwise occurs during the night.

Both on the outside and the inside, the solar collector film and the infrared collector film are covered by a layer of synthetic foam, for example polystyrene, so that no excessive heating of the balloon surface occurs.

The helium reservoir 43 is linked via a pipe 49 with the interior of the pressurised balloon 11. A pump 47 allows the helium to be fed either into this pressurised balloon 11 or into an additional helium-filled balloon 58, said balloon 58 being contained in the platform 10 or outside and serving as compensation chamber for any altitude adjustment of the whole aircraft. A pressure gauge 48 available to the control unit is also provided in the pipe 49.

The compensation tank 22 for the outside air, already mentioned, ensures constant pressure and constant volume in the low or high pressure insulation chamber 20 and thus also the maintenance of the aerodynamic outer form of the outer balloon 12.

In the circuit diagram according to FIG. 2B, unlike that according to FIG. 2A, it is not air but helium which is used as insulation gas. Therefore helium is fed from a storage container 22' into the insulation chamber 20. Otherwise the same units as in FIG. 2A are provided, which are assigned the same reference numbers. There will therefore not be any further details given.

As can be seen from FIG. 2A, 2B and FIG. 3 respectively, all the equipment, such as the cooling unit 30 and the heating unit 31 etc., is contained in the platform 10. Obviously, additional instruments and units, not shown in more detail, could be accommodated in this platform 10, for example all of the electronics, batteries, control devices and many more.

In the variant of an unmanned aircraft 1' shown in FIG. 3, there is also an outer balloon 12' inflatable into an aerodynamic form, although here there are two low or high pressure insulation chambers 50, 51 formed around the pressurised balloon 11. The outer balloon 12' has an external sheath 55 and an internal sheath 56, between which the one, first insulation chamber 50 filled with the circulating medium is formed, which medium in this solution can also be cooled by means of a cooling unit 31' and heated by means of a heating unit 31'. There is also a compensation tank 22' with a pump 21', a pressure and a temperature gauge provided, similarly as in FIG. 2.

Helium is used as medium in this variant, as its specific gravity is less than that of air. The helium is supplied by reservoirs 43' and 43" leading into the pressurised balloon 11, of which the one reservoir 43' is filled with liquid helium, while the other is filled with gaseous helium. These reservoirs 43', 43" are also connected with an additional helium-filled balloon 58, which is provided to even out the altitude of the aircraft. A pump 44 feeds helium either from the reservoir 43" under high pressure into the balloon 11, or else helium is let out of the balloon 11 into this additional balloon 58 by this pump, in order to guarantee a constant pressure in the balloon 11. In this way it is possible in principle also to alter the altitude of the aircraft 1, by letting additional air in or out. There is also an overpressure valve 45 and a pressure gauge, not shown in more detail.

The other low or high pressure insulation chamber 51 formed between the inner sheath 56 and the pressurised balloon 11 is filled with outside air by means of a pump 21' from a compensation tank 22'. The air can be let out of the insulation chamber 51 via an outflow 59, so that the pressure in this chamber 51 can be kept constant. Accordingly, again, the pressure and also the height above sea level can be measured and transmitted to the control unit, which is not shown in more detail.

Similarly to the variant according to FIG. 2, the outer balloon 12' is again provided with the solar collector film 40 and the infrared collector film 41, with which the solar radiation during the day and infrared re-radiation from the earth during the night are energetically exploited.

In the embodiment according to FIG. 3, the protection of the pressurised balloon 11 against temperature fluctuations is even further improved by comparison with the embodiment according to FIG. 2. Due to the fact that the gas pressure in the pressurised balloon 11 of the aircraft 1 or 1' according to the invention can be largely kept constant and is not exposed to the negative effects of the extreme day/night temperature differentials, the aircraft can remain in service for considerably longer and, together with its platform 10, better maintain its position with respect to the earth (or with respect to a specific area on the earth).

FIG. 4 shows a top view of the platform 10, which in this case has a delta-shaped design. This platform 10 is assigned several propellers 15, for example four, distributed on its rear side, driven by an electromotor 15'. These propellers 15 are—as already mentioned—controllable at individual speeds and also arranged pivotably, in order to bring the aircraft 1 into a specific position and direction with respect to the surface of the earth, preferably in the direction of rotation of the earth and consequently to keep it in the same position and direction with respect to the earth at all times. Also, horizontal stabilisers 19 are assigned to the back side of the platform 10 for any altitude adjustment of the latter.

The platform 10 is, according to FIG. 4, preferably designed in such a way aerodynamically that together with a parachute belonging to the "payload plane" of the platform 10, it can be guided back to earth like an independent aircraft.

The aircraft 1 is obviously equipped with a complete control system, so that it automatically places itself in the desired position with respect to the surface of the earth. It is also linked to a control centre on earth, so that data transfer and control options can be conducted from the earth.

When the aircraft 1 rises from the earth it is advantageously fitted, according to FIG. 5, with additional balloons 5, as the result of which this rise can occur rapidly so that the troposphere can be crossed in a short time. As soon as it reaches the stratosphere, these balloons can be ejected. In principle, however, the aircraft can also be brought to the desired altitude without additional balloons.

The platform 10 is separated from the balloons 11, 12 following the pumping of the helium gas or the other gas into the balloon 58, by detaching the supporting elements 17 from the platform 10, after which it falls downwards. At various altitudes, various parachutes are opened as required, while at the altitude of some 3 to 5 km, according to FIG. 6, a parachute 61 is opened and the platform 10 is guided with the aid of the working propellers 15 to the desired location on earth. Due to the load-bearing support of this parachute 61, the platform 10 can be made with smaller dimensions. The remaining balloons 11, 12 are destroyed in the atmosphere.

Instead of helium or air in the balloons, other gases, such as oxygen, argon or similar could be used, and instead of propellers 15 jet engines or similar could also be used.

The invention claimed is:

1. Unmanned aircraft stationable at a pre-determined altitude in the stratosphere, comprising:
    a platform for telecommunications equipment or scientific equipment,
    an outer balloon having an aerodynamic external shape at least when present in the stratosphere, a pressurized balloon which is fillable with gas and that supports the platform, the pressurized balloon being arranged within the outer balloon such that the outer balloon forms at least one insulating chamber around the pressurized balloon, the insulating chamber being fillable with a medium that circulates therethrough,
    heating and cooling means for heating and cooling the medium circulating in the insulating chamber, and
    position maintaining means located outside the outer balloon for maintaining the position of the platform relative to the Earth,
    the heating and cooling means comprising a heating unit and a cooling unit configured to heat and cool, respectively, the medium circulating through the insulating chamber, the heating unit and cooling unit being configured to operate alternately and both being arranged outside of the outer balloon.

2. Aircraft according to claim 1, wherein the position maintaining means comprise electrically-driven propellers.

3. Aircraft according to claim 2, wherein the propellers are attached pivotably on the platform underneath the outer balloon, the propellers being provided with individual speeds, thus enabling the aircraft to be rotated in a horizontal plane and thus adopting the desired direction of flight at all times.

4. Aircraft according to claim 3, wherein the platform has an aerodynamic external shape and is equipped with a parachute, together with which, after separation from the pressurized balloon and the outer balloon, the platform can be steered back to Earth as an independent aircraft.

5. Aircraft according to claim 2, further comprising a solar collector film arranged on an outer surface of the outer balloon, the solar collector film being configured to generate electrical energy, the propellers being coupled to the solar collector film and being powered by electrical energy generated by the solar collector film.

6. Aircraft according to claim 1, wherein the medium circulating through the insulation chamber is outside air, the heating unit being configured to heat the outside air during the night and the cooling unit being configured to cool the outside air during the day.

7. Aircraft according to claim 1, wherein the medium circulating through the insulation chamber is helium, the heating unit being configured to heat the helium during the night and the cooling unit being configured to cool the helium during the day.

8. Aircraft according to claim 7, further comprising an additional insulation chamber, between the insulation chamber, and the pressurized balloon, the additional insulation chamber being arranged to contain outside air.

9. Aircraft according to claim 1, further comprising a solar collector film arranged on an outer surface of the outer balloon and an additional plastic layer applied to the solar collector film as a heat shield.

10. Aircraft according to claim 9, wherein the solar collector film is configured to generate electrical energy, the heating unit and the cooling unit being coupled to the solar collector film and being powered by electrical energy generated by the solar collector film.

11. Aircraft according to claim 1, further comprising an infrared collector film arranged in connection with the outer balloon.

12. Aircraft according to claim 11, wherein the infrared collector film is in the form of a dark, approximately 12 μm thick aluminum film, and an additional layer of plastic is applied to the inside of the infrared collector film as a heat shield.

13. Aircraft according to claim 11, wherein the pressurized balloon and the outer balloon are made from a transparent material, and the infrared collector film is applied on the inside of the outer balloon facing towards the Earth.

14. Aircraft according to claim 1, further comprising an additional helium-filled balloon, which is contained in the platform and serves as compensation chamber for altitude regulation of the entire aircraft and also for simpler landing of the platform.

15. Aircraft according to claim 1, wherein the heating unit and the cooling unit are arranged in the platform.

16. Aircraft according to claim 1, further comprising a pump configured to pump the medium from the insulating chamber between the pressurized balloon and the outer balloon and direct the medium to the heating unit and the cooling unit.

17. Aircraft according to claim 16, further comprising a drainage line connecting the insulating chamber between the pressurized balloon and the outer balloon and the pump.

18. Aircraft according to claim 16, wherein the pump is arranged outside of the outer balloon.

19. Aircraft according to claim 1, wherein the cooling unit is configured to receive the medium from the insulating chamber between the pressurized balloon and the outer balloon and cool the received medium, and then the cooled medium being directed back into the insulating chamber between the pressurized balloon and the outer balloon.

20. Aircraft according to claim 1, wherein the cooling unit is a heat exchanger configured to exchange heat between the medium circulating through the insulating chamber between the pressurized balloon and the outer balloon and outside air.

\* \* \* \* \*